Dec. 20, 1955  G. KODET  2,727,529
RELIEF VALVE
Filed Feb. 2, 1951
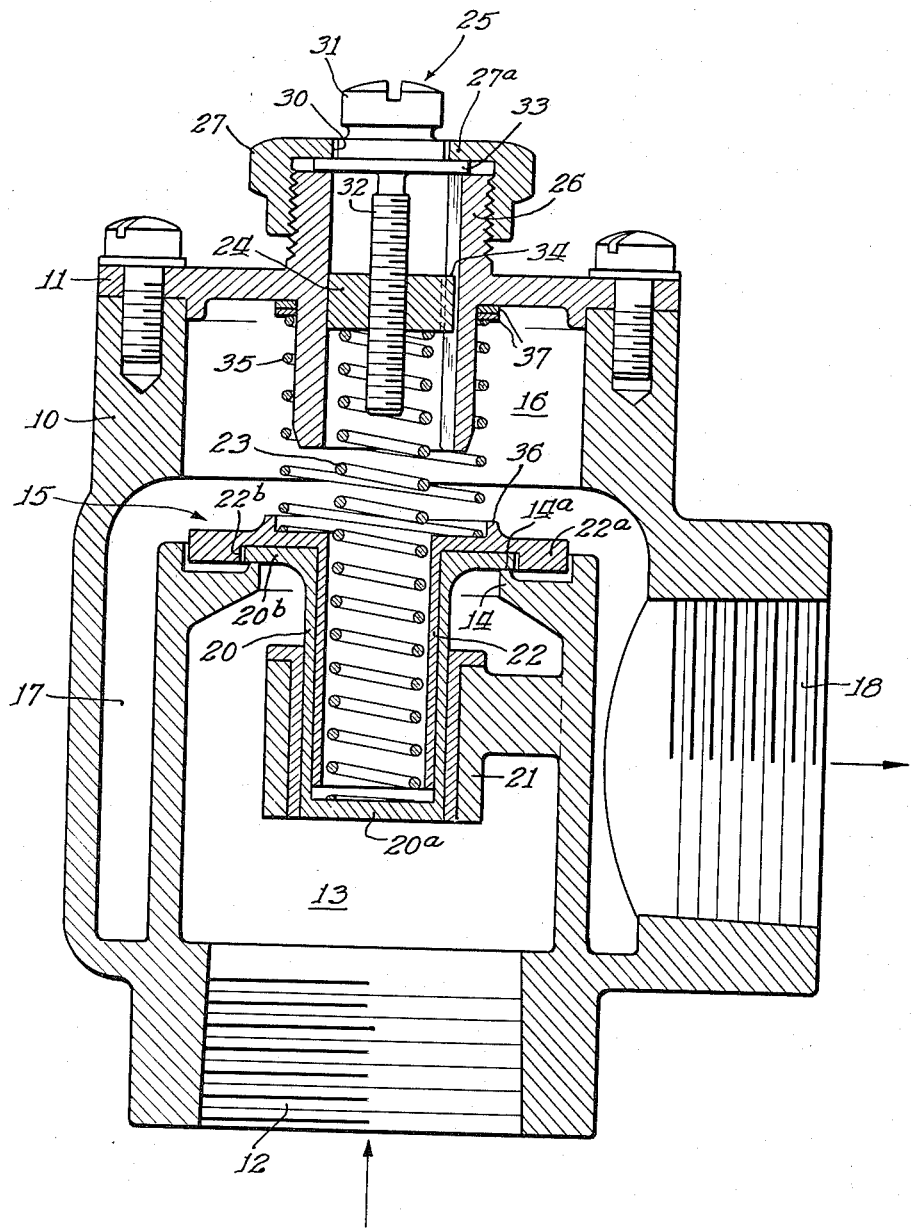
Inventor:
Gustav Kodet
By: Edward C. Fritz...
            Atty.

United States Patent Office 2,727,529
Patented Dec. 20, 1955

2,727,529

RELIEF VALVE

Gustav Kodet, Cleveland, Ohio, assignor to Borg-Warner Corporation, Chicago, Ill., a corporation of Illinois Application February 2, 1951, Serial No. 209,011

6 Claims. (Cl. 137—469)

This invention relates to a relief valve and more particularly to a relief valve arranged to open and commence relieving at a predetermined pressure value and once cracked, to open fully. The valve is also arranged to close rapidly when pressure drops to a second value below the opening value.

Relief valves that begin to open at a predetermined pressure value and as the pressure rises open further to prevent the pressure from rising beyond a predetermined maximum value are well known to the art. In some types of control applications, however, it is desirable that the relief valve once cracked, that is, opened partially, shall then open immediately to full open position to relieve completely the inlet pressure thereto. It may then be desirable that the relief valve be arranged to close at a second predetermined inlet pressure, somewhat less than the opening pressure.

An object of the present invention is to provide a new and improved relief valve, and more particularly a relief valve arranged to open fully upon initial cracking at a predetermined desired first pressure value and then to close fully when the inlet pressure to the valve drops below a second predetermined pressure value somewhat lower than the first pressure value.

A further object of the present invention is to provide such a relief valve which may be readily adjusted to different operating conditions.

A further object of the present invention is to provide such a relief valve which will require a minimum of lubrication.

In accordance with one embodiment of this invention, the relief valve may comprise a two-part valve assembly wherein individual loading springs are associated with each valve and initially the two valves move as a unit toward open position in response to inlet pressure of a predetermined value exceeding the compression force exerted by the two loading springs. Then as the first valve cracks, pressure is admitted to the underside of the second valve, causing this second valve to move to fully open position, thereby relieving a part of the second valve pressure exerted on the valve assembly by eliminating the effect of the second valve loading spring, and thus causing the first valve to move also to fully open position, since the pressure which was at least equal to the sum of the two loading spring pressures exceeds the force exerted by either loading spring operating alone. Dropping of inlet pressure below a second predetermined value, as determined by the compression force exerted by the spring associated with the first valve causes the first valve to seat and thereafter prevents passage of pressure to the second valve, whereupon the second valve will seat. The compression forces exerted by the two springs are individually adjustable.

Other objects and advantages of the present invention will be apparent from the following detailed description taken in conjunction with the drawings wherein the single figure is a vertical, sectional view taken through the valve.

Referring now to the drawing, it will be seen that the relief valve of this invention is enclosed in a two-piece housing comprising a main or body portion 10 and an upper or cover portion 11. A large inlet port 12 is formed in the lower end of the housing 10 and communicates at its upper end with a somewhat larger inlet chamber 13. At approximately the mid portion of the housing 10 the housing is flanged inwardly, the flange 14 having a ridge formed around the upper side of its inner periphery to provide an annular valve seat 14a on the upper side of which, in the closed position of the valve, there rests a two-part valve assembly 15. The valve seat flange 14 and the valve assembly 15 thus divide the valve chamber 13 into a lower section 13 and an upper section or chamber, designated 16, the upper end of which is closed by the cover member 11 of the housing. When the valve assembly 15 is opened, then pressure in the lower chamber 13 escapes upwardly into the chamber 16 and from thence through an annular passage 17, communicating with chamber 16, to the outlet port 18 of the valve.

The valve assembly 15 comprises a first valve 20, which is of generally cylindrical shape and has a closed lower end 20a and an outwardly flanged upper end 20b, the lower end of which flange 20b seats on the valve seat 14a at the upper edge of the valve seat flange 14. Cylindrical valve 20 has its lower portion journalled in a suitably apertured journal element 21, which may be integrally formed with the inner side walls of the housing 10.

Received within the barrel or cylindrical portion of the valve 20 and movable relatively thereto is a second or piston valve 22, also having a generally cylindrical body portion but an open lower end to prevent hydraulic locking of the valve 22. The upper end of the valve 22 is also outwardly flanged, as indicated at 22a, and extends beyond the periphery of flange 20b of the first valve 20. More particularly, the underside of flange 22a is recessed annularly to receive the flanged portion 20b of valve 20, as indicated at 22b. The periphery of the portion of flange 22a lying radially outside of the recess 22b is fitted with a relatively close tolerance in the chamber 16 so as to maintain a substantially sealing relation with respect to the walls thereof, while permitting movement of the valve 22b with respect thereto in the manner of a piston.

It will be noted that the periphery of the flanged portion 22a of the second valve 22 on the right side is located, when the valve is in closed position, so that a portion thereof is below the edge of the entrance to the annular passage 17 leading to the relief outlet port 18. Accordingly, no relief is actually effected until the piston valve 22 is moved upwardly past the lower edge of the entrance to passage 17.

Valve 20 is normally held closed by means of a first, coiled compression spring 23, the lower end of which spring bears against the inner side of the bottom portion 20a of the valve 20. The upper end of spring 23 bears against the underside of an adjusting member 24 carried by an adjusting assembly designated generally at 25.

The adjusting assembly 25 comprises a hollow cylinder 26 which is integrally formed with the cover portion 11 and the lower portion of which cylinder extends into the chamber 16. The upper portion of the cylinder 26 is peripherally threaded and a locking cap 27 is threaded thereon. Cap 27 has an aperture 30 formed through the center portion thereof to permit the head 31 of an adjusting screw 32 to extend therethrough, the peripherally threaded body portion of the screw 32 extending downwardly into the cylinder 26. Flanged portion 33 of the adjusting screw 32 is disposed between the upper end of the cylinder 26 and the overhanging or head portion 27a of the cap 27 so as to be sandwiched therebetween when the cap is tightened in place. By loosening the cap 27 the screw 32 may be rotated to cause the nut 24, which is threaded on screw 32 and keyed to the cylinder 26 by spline 34, to move upwardly or downwardly to change the compression of spring 23.

A second coiled compression spring 35 is associated with the second valve 22 and its lower end bears against the upper side of the flanged portion 22a thereof while its upper end bears against the underside of the head or cover portion 11 of housing 10. The upper portion of the spring 35 surrounds the cylinder 26 and is thereby prevented from shifting to one side or the other while the lower end is retained in position by an annular ridge 36 formed on the upper side of valve 22. The spring 35 is adjusted as to compression by adding or removing shims 37 which are readily located between the upper end of the spring and the underside of the housing cover 11.

Assuming that the design requirements for the valve are that the valve close at a certain pressure value such, for example, as 22 p. s. i. Spring 23 is then adjusted by operating the adjusting assembly 25 until it causes valve 20 to just seat when the exposed portion of the valve is acted upon by a 22 p. s. i. inlet pressure value, over its effective area. The second valve member, that is, the piston valve member 22 with its companion spring 35 is then added to the first valve member 20 and spring 35 is shimmed up, as previously explained, until the total pressure acting upon the first valve will just offset the desired opening pressure which may be, for example, 24 p. s. i. Under this condition, it will be evident the inlet pressure on the effective area on the underside of the first valve 20 must overcome the combined pressures of both the spring 23 and the spring 35 acting in parallel; that is to say, the inlet pressure must exceed 24 p. s. i. Under this arrangement, the value of spring pressure exerted by spring 35 is equal to the difference in pressure necessary to crack open the valve assembly 15 and the pressure at which it is desired to close the value. In the case assumed, this value is the difference between 24 p. s. i. and 22 p. s. i.

When the valve assembly 15 is subjected to an inlet pressure of 24 p. s. i., this pressure will initially cause both the valve member 20 and the valve member 22 comprising the valve assembly 15 to move slightly upwardly in unison, this upward movement being sufficient to open a passage between the valve 20 and the valve seat 14a. When the valve assembly 15 has moved to this position, then the 24 p. s. i. inlet pressure is applied to the underside of the upper valve 22, the upward movement of which is resisted only by the relatively light spring 35, which is arranged to provide, in the case assumed, a downward pressure on the order of 2 p. s. i. This inlet pressure applied to the underside of valve 22 is thus considerably in excess of the spring pressure exerted by spring 35 with the result that valve 22, acting as a piston within the chamber 16, will open by a snap action.

With the spring pressure exerted by spring 35 eliminated from the valve assembly, the 24 p. s. i. inlet pressure is now acting only against spring 23 which is set for 22 p. s. i. The lower or first valve 20 will then too be lifted off the valve seat 14 by a poppet action due to the disturbed equilibrium. Full relief now takes place.

When the inlet pressure to the valve assembly drops to 22 p. s. i., or whatever other pressure value the spring 23 is set for, the lower valve 20 will then close and immediately terminate delivery of pressure to the underside of valve 22. Valve 22 will then also close, spring pressure exerted by the spring 35 urging the valve downwardly causing it to seat on the upper side of valve 20. Thereafter, the combined effect of the two springs is effective and, in the case assumed, it will again require 24 p. s. i. on the inlet side to unseat the valve.

From the foregoing it will be evident that by a proper selection of the coiled compression springs 23 and 35 and by appropriate selection of the effective areas of the valves 20 and 22, the relief valve constructed in accordance with this invention may be made to operate over a very wide range of operating conditions. It will also be apparent that because of the very considerable forces exerted during the opening and closing operations of these valves, the action is very rapid and will occur despite minimal lubrication.

Where herein the various parts of this invention have been referred to as being located in a right or a left position, or an upper or a lower position, it will be understood that this is done solely for the purpose of facilitating description and that such references relate only to the relative positions of the parts as shown in the accompanying drawings.

What is claimed is:

1. A relief valve including means defining a chamber having an inlet port and an outlet port and valving means interposed between said ports effective to control communication therebetween, said valving means including a first valve and a piston arranged in tandem with the piston arranged for movement to fully open position independent of the first valve, a first resilient means associated with said valve and urging said valve toward closed position, a second resilient means associated with said piston and urging said piston in the same direction as said valve is urged by said first resilient means, said valve being interposed between said piston and said inlet port whereby said valve controls application of fluid pressure to said piston, a valving surface on said piston interposed between said valve and said outlet port, said piston being normally urged against said valve by said second resilient means whereby to supplement the closing force exerted on said valve by said first resilient means, said piston being shifted to fully open position independent of said valve in response to opening of said valve to remove said second resilient means as a factor in urging said valve toward closed position.

2. A relief valve including means defining a chamber having an inlet port and an outlet port and valving means interposed between said ports effective to control communication therebetween, said valving means including a first valve and a piston arranged in tandem with the piston arranged for movement to fully open position independent of the first valve, a first resilient means associated with said valve and urging said valve toward closed position, a second resilient means associated with said piston and urging said piston in the same direction as said valve is urged by said first resilient means, said valve being interposed between said piston and said inlet port whereby said valve controls application of fluid pressure to said piston, a valving surface on said piston interposed between said valve and said outlet port, said piston being normally urged against said valve by said second resilient means whereby to supplement the closing force exerted on said valve by said first resilient means, said piston being shifted in response to opening of said valve to remove said second resilient means a factor in urgnig said valve toward closed position, said piston being movable thereafter independently of said valve to move said valving surface to fully open position.

3. A relief valve assembly including a primary valve, a spring associated with said primary valve, a secondary valve associated with said primary valve and arranged for movement to fully open position independent of the primary valve, and a second spring associated with said secondary valve and urging the same against said first valve to cooperate with said first spring in holding said first valve closed, said second spring exerting a substantially lesser force on said second valve than is exerted on said first valve by said first spring, said second valve being movable to fully open position independent of the primary valve in response to opening of said first valve to admit pressure to said second valve sufficient to overcome the force exerted by said second spring only, whereby to eliminate said second spring as a factor in urging said first valve toward closed position.

4. A relief valve assembly including means defining a chamber having an inlet port and an outlet port and valving means interposed between said ports to control the pressure therebetween, said valving means including a first valve and a second valve arranged in tandem and movable independently of each other, said first valve being subject to the pressure in the inlet port and adapted to open when said pressure exceeds a predetermined amount, a first resilient means urging said first valve toward closed position, a second resilient means urging said second valve toward said first valve and toward closed position, said second resilient means supplementing the first resilient means urging said first valve toward closed position, said second valve being subject to the pressure in said inlet only upon opening of said first valve to overcome said second resilient means and fully remove its force from acting upon said first valve.

5. A relief valve as claimed in claim 4 wherein the outer periphery of said second valve lies radially outwardly of the periphery of said first valve and in close contact with the valve chamber maintaining substantially sealing relation therewith to obtain piston-like action of said second valve.

6. A relief valve as claimed in claim 4 wherein said second valve is recessed to receive a portion of said first valve and is in close contact therewith maintaining substantially sealing relation therebetween to obtain piston-like action of said second valve.

References Cited in the file of this patent

UNITED STATES PATENTS

| 451,210 | Hayden | Apr. 28, 1891 |
| 2,280,937 | Thornhill et al. | Apr. 28, 1942 |
| 2,420,370 | Hamilton | May 13, 1947 |
| 2,644,480 | Earle | July 7, 1953 |

FOREIGN PATENTS

| 308,507 | Great Britain | Mar. 28, 1929 |